US009257824B2

(12) United States Patent
Laye et al.

(10) Patent No.: US 9,257,824 B2
(45) Date of Patent: Feb. 9, 2016

(54) ELECTRICAL ENCLOSURE WITH IMPROVED MECHANICAL ARRANGEMENT

(71) Applicant: SCHNEIDER ELECTRIC INDUSTRIES SAS, Rueil-Malmaison (FR)

(72) Inventors: Jerome Laye, Grenoble (FR); Abderrahmane Agnaou, Grenoble (FR); Olivier Wasner, Echirolles (FR); Alain Perrin, Saint Nicolas de Macherin (FR); Dominique Socquet, Biviers (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 55 days.

(21) Appl. No.: 14/196,222

(22) Filed: Mar. 4, 2014

(65) Prior Publication Data

US 2014/0262489 A1    Sep. 18, 2014

(30) Foreign Application Priority Data

Mar. 12, 2013    (FR) ..................................... 13 52174

(51) Int. Cl.
*H02G 3/08* (2006.01)
*H02G 3/16* (2006.01)
*H02B 1/32* (2006.01)

(52) U.S. Cl.
CPC ... *H02G 3/16* (2013.01); *H02B 1/32* (2013.01)

(58) Field of Classification Search
CPC ........... H02G 3/08; H02G 3/081; H02G 3/16; H05K 5/00; H05K 5/02; H02B 1/32; H02B 1/34; H02B 1/42; H02B 1/48

USPC ........... 174/50, 520, 535, 537, 541, 545, 559, 174/560, 561, 562, 54, 480; 361/600, 601, 361/724, 730, 731, 732, 752; 211/26
See application file for complete search history.

(56) References Cited

U.S. PATENT DOCUMENTS 6,021,909 A *   2/2000   Tang et al. ...................... 211/26
6,348,655 B1 *  2/2002   Wright ............................ 174/50

(Continued)

FOREIGN PATENT DOCUMENTS

| DE | 195 39 420 A1 | 4/1997 |
| EP | 0 668 644 A1  | 8/1995 |
| EP | 1 213 805 A1  | 6/2002 |

OTHER PUBLICATIONS

French Preliminary Search Report issued Sep. 10, 2013, in French Application No. 13 52174 filed Mar. 12, 2013 (with English Translation of Categories of Cited Documents).

*Primary Examiner* — Angel R Estrada
(74) *Attorney, Agent, or Firm* — Oblon, McClelland, Maier & Neustadt, L.L.P.

(57) ABSTRACT

An electric cabinet comprising an outer frame defining the general shape of the electric cabinet and an inner frame comprising fixing uprights and cross-members, a functional assembly fixed onto the inner frame and comprising a plurality of functional units each equipped with a mounting plate designed to receive one or more electric equipment units. The mounting plates are fixed onto the uprights and fixing cross-members in contiguous manner to form a separating partition delineating a first space located towards the front part and a second space located towards the rear part. The functional assembly comprises at least one support fixed in independent manner onto an upright or a cross-member of the inner frame and a connector arranged on the support, the support being positioned on the upright or fixing cross-member so as to enable the connector to pass through an opening made through the mounting plate.

12 Claims, 10 Drawing Sheets

(56) References Cited

U.S. PATENT DOCUMENTS

| | | | |
|---|---|---|---|
| 6,654,255 B2 * | 11/2003 | Kruse et al. | 174/480 |
| 7,187,265 B1 * | 3/2007 | Senogles et al. | 211/26 |
| 7,239,521 B2 | 7/2007 | Quero et al. | |
| 7,825,333 B2 * | 11/2010 | Puccini | 174/50 |
| 8,456,814 B2 * | 6/2013 | Gerovac et al. | 174/50 |
| 9,049,802 B2 * | 6/2015 | Yi et al. | |
| 2004/0047137 A1 | 3/2004 | Quero et al. | |

\* cited by examiner

ELECTRICAL ENCLOSURE WITH IMPROVED MECHANICAL ARRANGEMENT

BACKGROUND OF THE INVENTION

The present invention relates to an electric cabinet with improved mechanical arrangement.

STATE OF THE ART

An electric cabinet comprising a perforated base plate on which modules can be mounted by means of hooks and screws, each module presenting a base, with for example a DIN rail mounted on one face of said base and a plurality of electric components fixed onto the DIN rail, is known from U.S. Pat. No. 7,239,521. Each module comprises an interface to connect to a common bus performing both electric power supply and data transfer between the modules.

This configuration presents certain drawbacks. It requires wiring via the front between the modules and does not enable the heat dissipation of the modules to be optimized.

The object of the invention is therefore to propose an electric cabinet wherein the mechanical arrangement makes for ease of wiring and achieves an optimized heat dissipation.

SUMMARY OF THE INVENTION

This object is achieved by an electric cabinet comprising a front part and a rear part, an outer frame defining the general shape of the electric cabinet and an inner frame comprising fixing uprights and cross-members positioned in one and the same plane, a functional assembly fixed onto the inner frame and comprising a plurality of functional units each provided with a mounting plate designed to receive one or more electric units, said cabinet being characterized in that:
- the mounting plates are fixed onto said fixing uprights and cross-members in contiguous manner to form a separating partition arranged in said plane and delineating a first space located towards the front part and a second space located towards the rear part,
- each mounting plate comprises at least one opening,
- the functional assembly comprises at least one support fixed in independent manner on an upright or a cross-member of the inner frame and a connector arranged on said support, said support being positioned on the fixing upright or cross-member in such a way as to enable the connector to pass through said opening made through the mounting plate.

According to one feature, each mounting plate comprises notches designed to collaborate with openings made on fixing uprights or cross-members of the inner frame.

According to another feature, the connector support comprises a fixing system by clip-fastening onto an upright or a cross-member of the inner frame.

According to another feature, each mounting plate is of rectangular shape presenting a front face for fixing electric units and a rear face.

According to another feature, the mounting plate comprises a DIN rail or a plate fixed onto the rear face so as to be able to fix one or more electric units.

According to another feature, the inner frame comprises two vertical uprights, called main uprights, and several horizontal cross-members, called main cross-members, extending between the two main uprights.

According to another feature, each mounting plate comprises an indentation enabling passage of a main cross-member.

According to another feature, the inner frame the inner frame comprises at least one upright vertical, called secondary upright, extending between two main cross-members.

According to another feature, the inner frame comprises at least one horizontal cross-member, called secondary cross-member, extending between a secondary upright and a main upright or between two secondary uprights.

According to another feature, each mounting plate comprises two parallel vertical edges provided, on their bottom part, with notches arranged to collaborate with openings made on a first upright or cross-member of the inner frame and, on their top part, with a cut-out enabling the shape of a second upright or cross-member of the inner frame to be snugly followed.

According to another feature, the mounting plate comprises an opening designed to receive a lifting ring or a gripping handle.

BRIEF DESCRIPTION OF THE FIGURES

Other features and advantages will become apparent from the following detailed description with respect to the following appended drawings.

DETAILED DESCRIPTION OF AT LEAST ONE EMBODIMENT

The invention relates to an electric cabinet and more particularly to its particular mechanical arrangement and its electric distribution.

Figure 1:
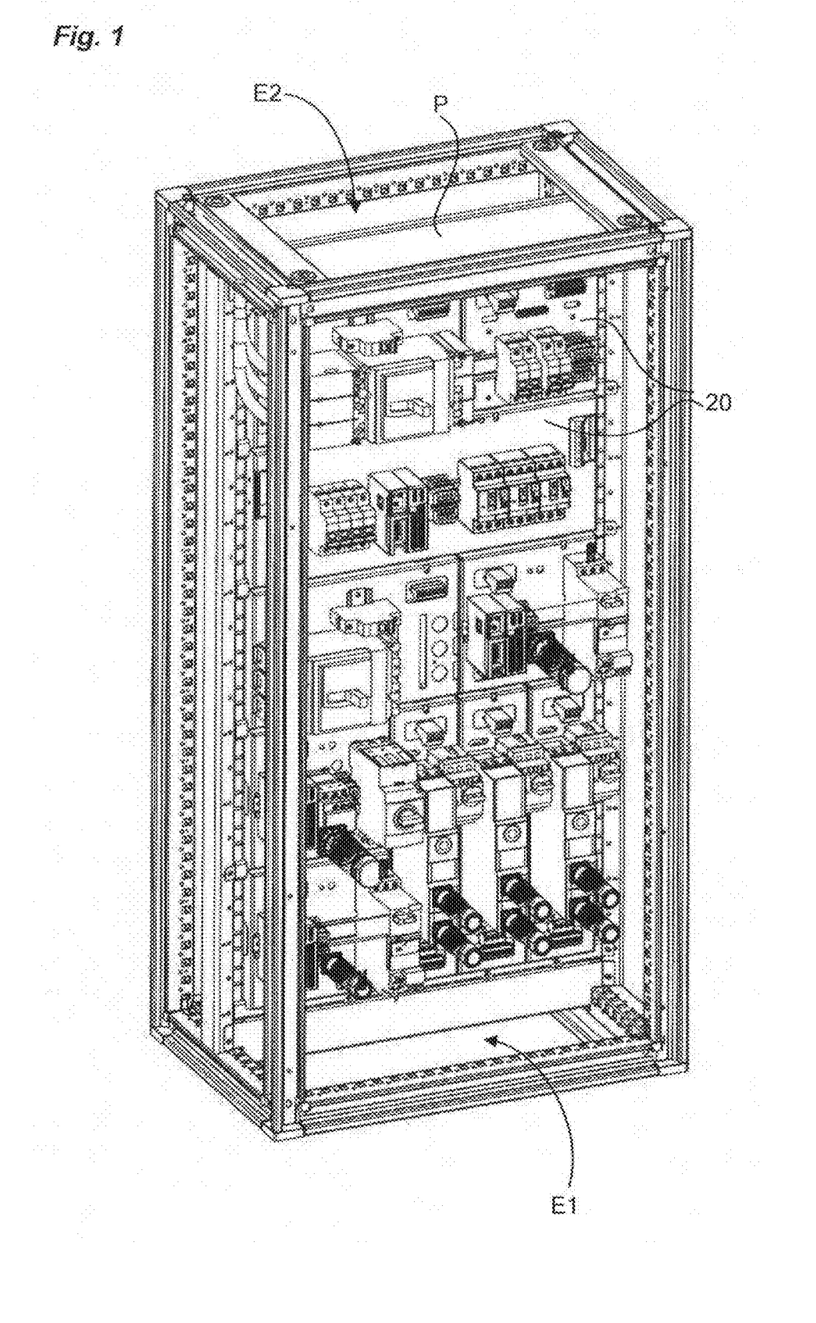
FIG. 1 represents the outer frame of an electric cabinet according to the invention in which functional units are positioned.

With reference to FIG. 1, an electric cabinet of the invention comprises an outer frame presenting for example a rectangular shape.

The outer frame thus comprises two identical bases each formed by four uprights assembled in a rectangle. The two bases are fitted parallel to one another and are assembled to one another by means of four vertical uprights, called external uprights. The four external vertical uprights are perpendicular to the two bases so as to form four parallel lateral faces parallel two by two.

Figure 2A:
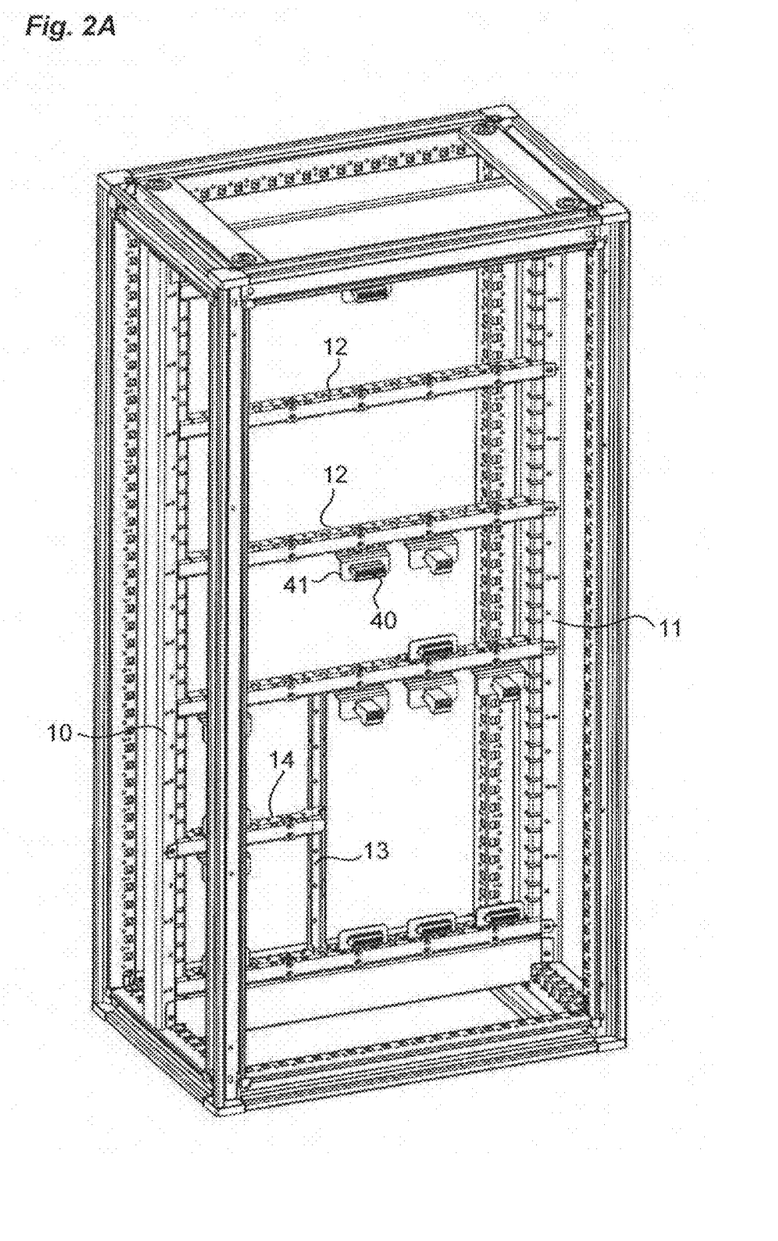
FIG. 2A represents the outer frame and the inner frame of the electric cabinet of the invention, without any functional units.

The electric cabinet also comprises an inner frame for fixing electric units inside the cabinet. This inner frame also comprises two vertical fixing uprights, parallel to one another, called main uprights 10, 11 (FIG. 2). The two main uprights 10, 11 extend between the two bases, in two parallel lateral faces of the cabinet.

Figure 9A:
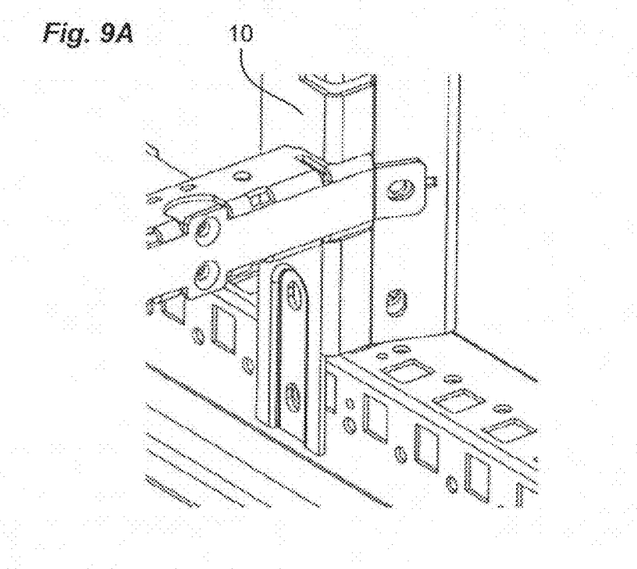
FIGS. 9A to 9C illustrate the mounting principle of the vertical uprights of the inner frame on the outer frame of the electric cabinet.
Figure 9B:
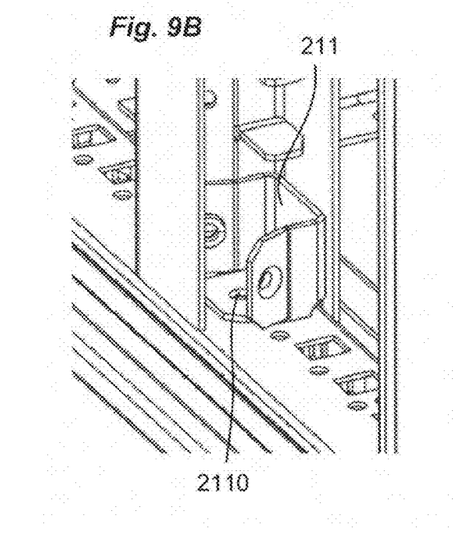
Figure 9C:
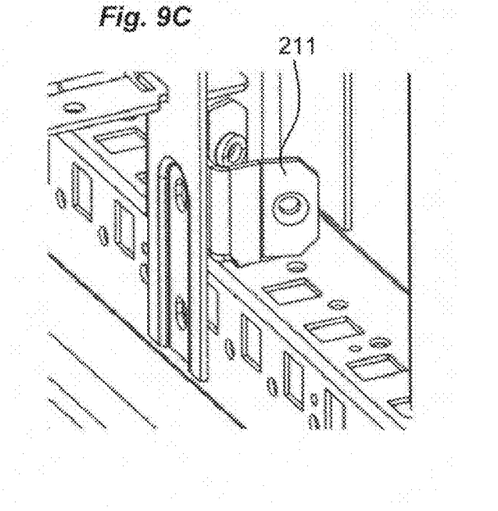
Figures 10A, 11A:
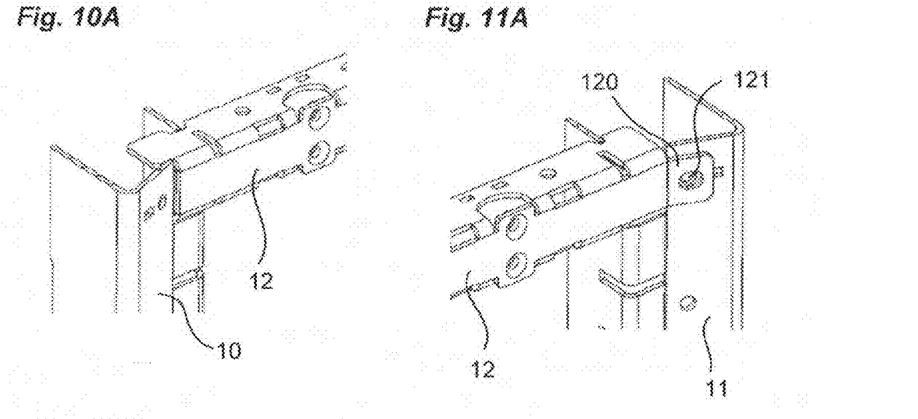
FIGS. 10A and 10B illustrate fixing of a first end of a main cross-member on a main upright.
FIGS. 11A and 11B illustrate fixing of a second end of a main cross-member on a main upright.
Figure 10B:
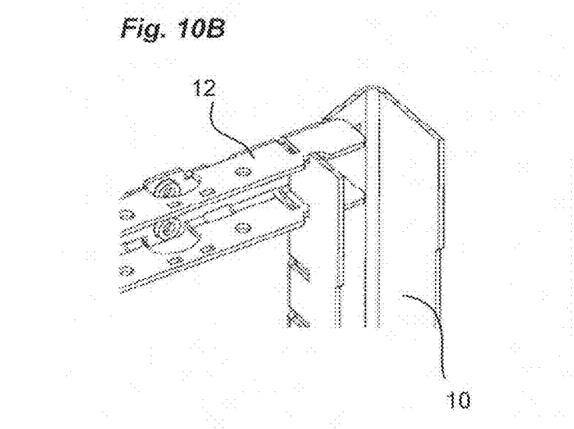
Figure 11B:
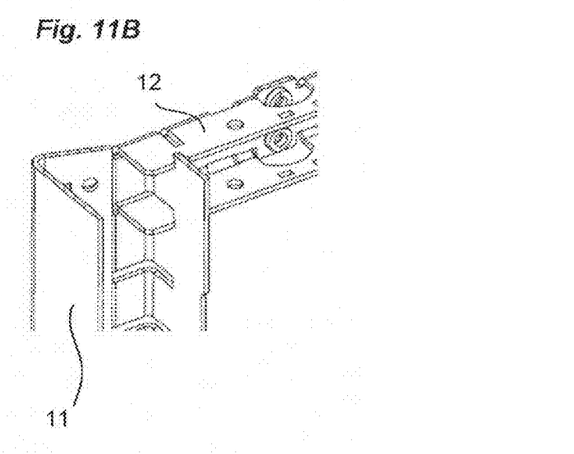

With reference to FIGS. 9A to 9C, the inner frame in particular comprises an interface part 211 for fixing a main upright 10, 11 onto the outer frame. This part 211 has an opening 2110 on its bottom surface for fixing onto the outer frame of the cabinet and also has two tabs performing indexing thereof in rotation. The part 211 further comprises several fixing holes on lateral wings enabling fixing of a main upright 10, 11. The inner frame further comprises horizontal cross-members 12, called main cross-members, extending between its two main uprights 10, 11. The main uprights comprise fixing means, preferably placed at regular intervals, for fixing the main cross-members 12 over the whole of their height. The first end of a main cross-member 12 is inserted in a first main upright 10 by mechanical wedging, advantageously without fixing (FIGS. 10A and 10B). The main cross-member 12 is then pivoted along its horizontal axis to a final position in which its second end comes into contact with the second main upright 11 (FIGS. 11A and 11B). The main cross-member 12 has at its second end an inclined fixing lug 120 enabling it to snugly follow the shape of the upright, said fixing lug 120 being provided with an opening 121 dedicated to receiving a fixing screw. The main cross-member 12 also has notches at its second end to laterally index the position of said cross-member 12 in the main upright 11, thereby ensuring precise referencing of the functional units on the inner frame.

The inner frame can also comprise one or more vertical uprights, called secondary uprights 13, extending between two main cross-members 12. Each main cross-member comprises fixing means, preferably located at regular intervals, enabling fixing of the secondary uprights 13.

Figure 2B:
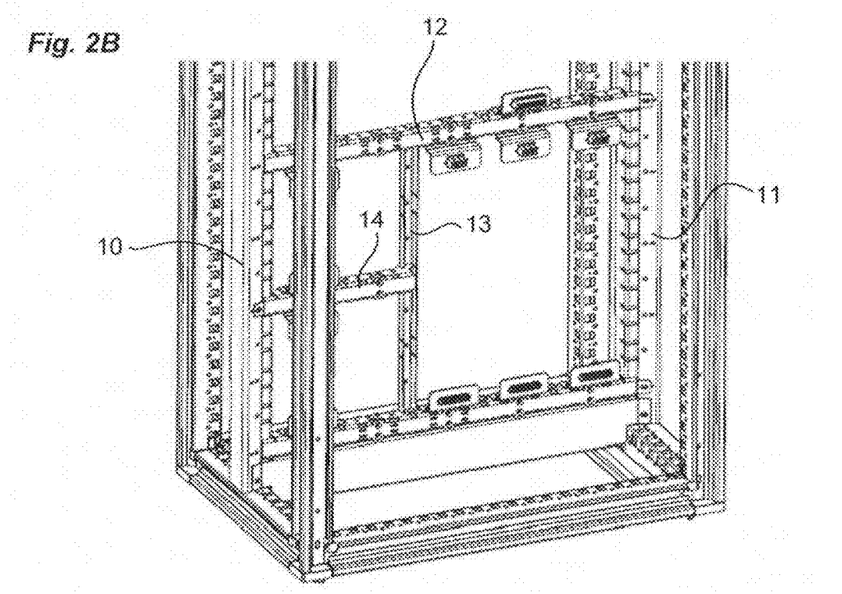
FIGS. 2B and 2C represent a detail of the electric cabinet of the invention and enable an example of arrangement of the inner frame and of functional units on said frame to be illustrated.
Figure 2C:
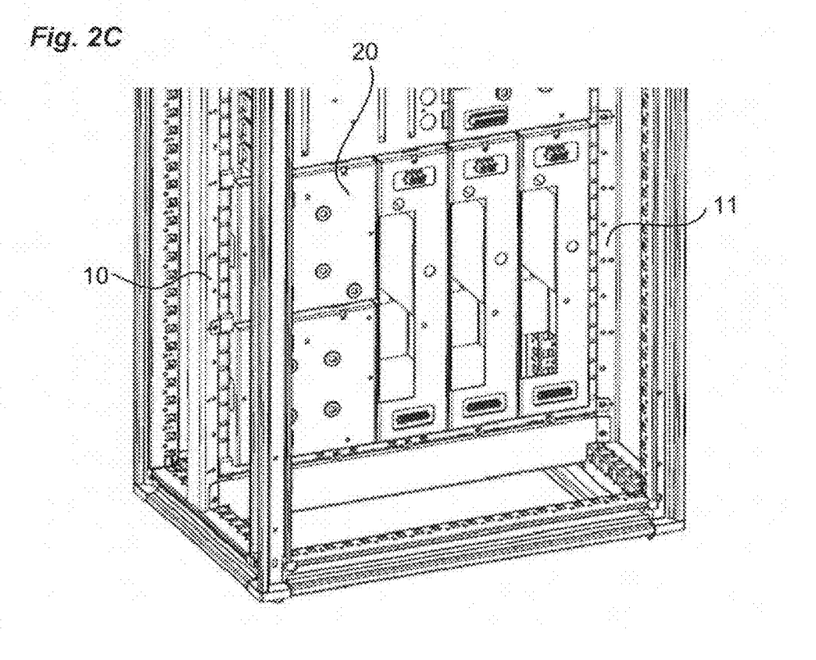

The inner frame can also comprise one or more secondary cross-members 14 extending between a secondary upright 13 and a main upright 10, 11 or between two secondary uprights. This combination of secondary uprights 13 and secondary cross-members 14 enables functional units 20 of variable dimensions to be fitted on the inner frame (FIGS. 2B and 2C).

Figure 2D:
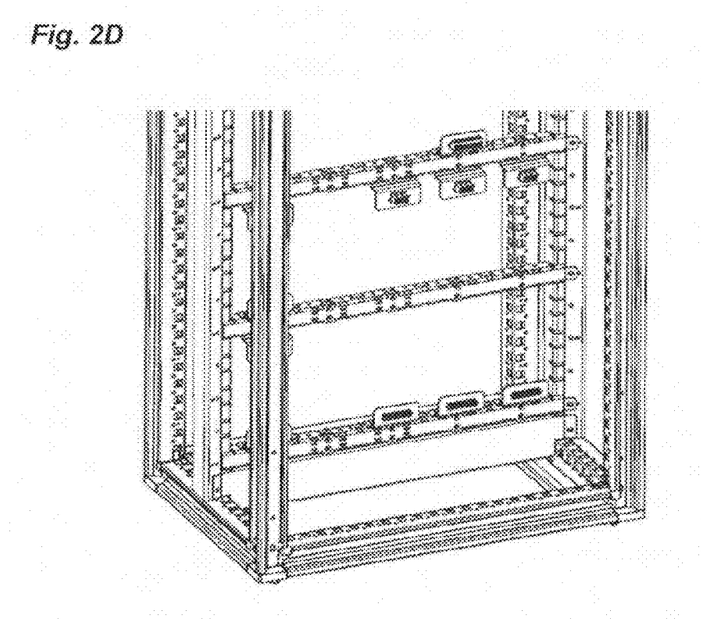
FIGS. 2D and 2E represent a detail of the electric cabinet of the invention and enable another example of arrangement of the inner frame and of functional units on said frame to be illustrated.
Figure 2E:
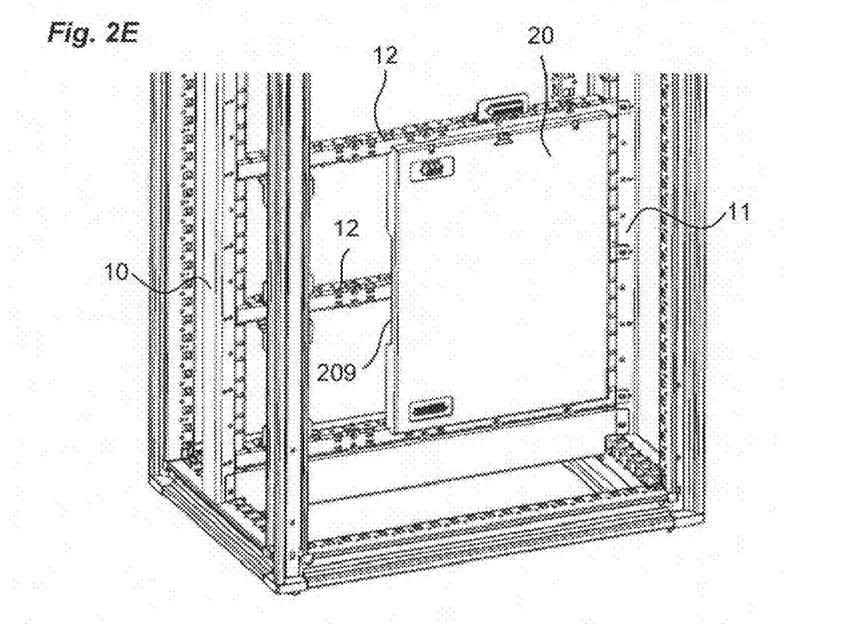

In another embodiment represented in FIGS. 2D and 2E, it is possible to arrange functional units of variable dimensions on the same width of the functional system using only horizontal cross-members. In this embodiment, a horizontal cross-member 12 passes behind the functional unit of large dimension (FIG. 2E).

A secondary upright 13 comprises fixing means, preferably located at regular intervals, enabling fixing of secondary cross-members 14.

Advantageously, the fixing intervals are all arranged with the same pitch so as to be able to form several rectangles, from the main uprights 10, 11 and secondary uprights 13 and the main cross-members 12 and secondary cross-members 14, dimensioned in suitable manner for fixing of functional units, described in the following.

According to the invention, the electric cabinet is in fact designed to accommodate a functional assembly comprising a plurality of functional units 20 fixed in continuous manner on the inner frame of the electric cabinet in order to delineate a separating partition P in the electric cabinet.

According to the invention, the separating partition P (FIG. 1) formed by fitting of the functional units 20 on the inner frame delineates a first space E1 situated towards the front part of the electric cabinet and a second space situated towards the rear part of the electric cabinet. The separating partition P thereby enables the first space E1 to be separated from the second space E2. This separating partition advantageously enables the depthwise volume of the electric cabinet to be used to the full. This volume can in fact be used to house all or part of the wiring of the electric unit in the second space E2. The arrangement and organization of the wiring, for example as far as assembly and maintenance are concerned, are therefore greatly improved. Wiring via the rear also enables the safety of the functional assembly to be enhanced.

The first space E1 can correspond to a cold thermal area in which electric units or parts of units which do not heat or heat very little will be placed. The second space E2 can correspond to a hot thermal area in which electric units or parts of units which heat will be placed. For example, the first space E1 will contain circuit breakers, contactors or the control parts of variable speed drives whereas the second space E2 will contain the power parts of the variable speed drives, filtering inductances, braking resistances, or transformers.

Figure 3:
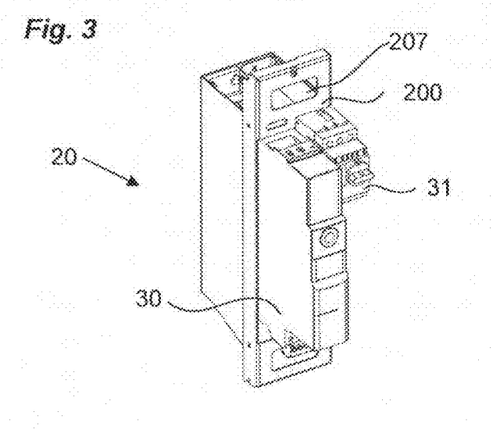
FIG. 3 represents a first example of a functional unit able to be fitted inside the electric cabinet of the invention.
Figure 4A:
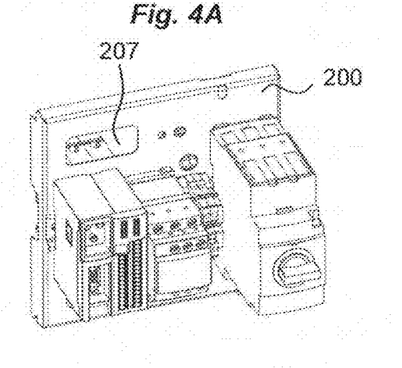
FIGS. 4A and 4B represent another example of a functional unit able to be fitted inside the electric cabinet of the invention, respectively in front view and rear view.
Figure 4B:
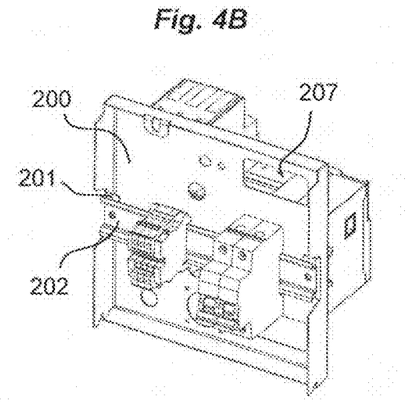
Figure 4C:
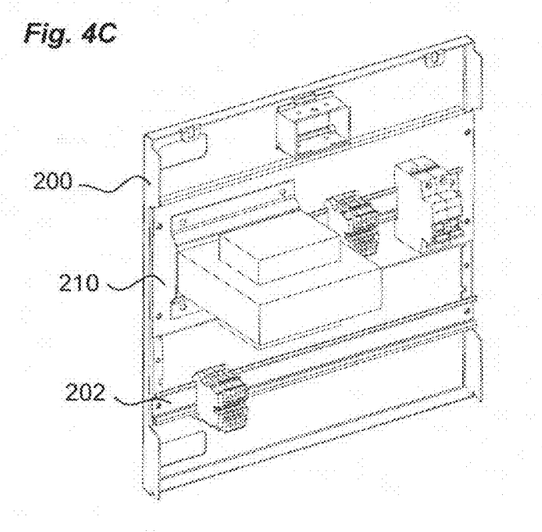
FIG. 4C represents the back of a mounting plate of a functional unit.
Figure 5:
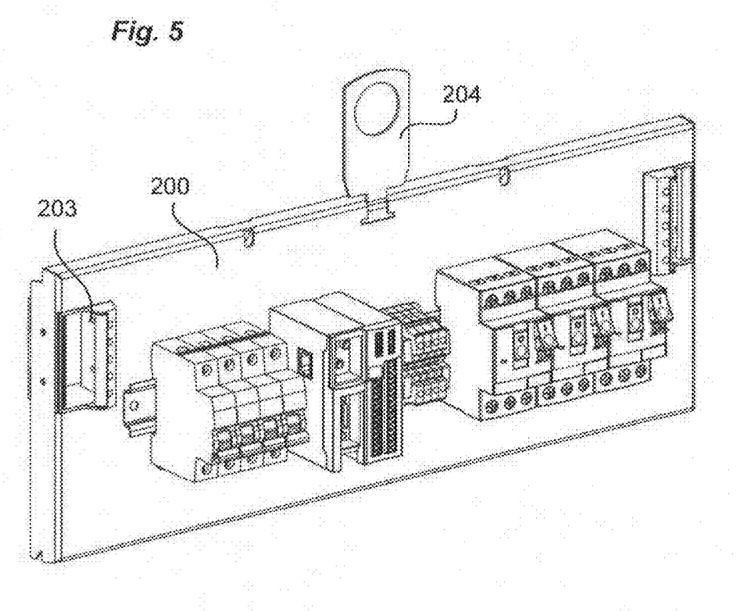
FIG. 5 represents another example of a functional unit able to be fitted inside the electric cabinet of the invention, on which at least one lifting ring or gripping handle is fitted.

With reference to FIGS. 3 to 5, a functional unit 20 mainly comprises a mounting plate 200 presenting a front face and a rear face on which one or more electric units can be mounted, able to perform instrumentation and control, protection, power supply generation, safety, ventilation or cooling functions. A mounting plate may naturally not support any electric unit and be used simply to form part of the separating partition. The mounting plates can be made in different sizes according to the quantity of electric units supported. They are for example made from cut and folded metal plate.

The architecture of the inner frame and the uprights and cross-members used will then be adapted to the functional units to be fitted.

Certain functional units comprise just electric instrumentation and control units which do not necessarily need to be cooled, whereas other electric functional units can comprise electric power units that are liable to heat considerably and therefore have to be cooled.

In the electric cabinet, the functional units 20 are mounted in contiguous manner on the inner frame so as to form the separating partition P.

FIG. 3 presents a first example of a functional unit 20 with a mounting plate 200 which supports a variable speed drive 30 and a circuit breaker 31. In this functional unit 20, the circuit breaker 31 is mounted on the front panel, whereas the variable speed drive 30 passes through the mounting plate 200 so as to have its monitoring part located on the front panel side and its power part located on the rear panel side.

FIGS. 4A and 4B present a second example of a functional unit 20. A contactor 32 and a circuit breaker 31 are in particular mounted on the front panel of the mounting plate. On its rear panel, the mounting plate 200 comprises for example two lugs 201 located on two parallel opposite sides for fixing of a DIN rail 202 designed to accommodate electric units. Several lugs can be provided over the height of the mounting plate in order to fix several DIN rails or fixing plates 210 for electric equipment units (FIG. 4C).

FIG. 5 presents a third example of a functional unit 20 having a mounting plate 200 which presents two lateral handles 203 enabling the functional unit 20 to be gripped with both hands, and an opening provided on its upper surface, in the middle of its length, designed to receive a lifting ring or a gripping handle 204 of the functional unit.

Figure 8A:
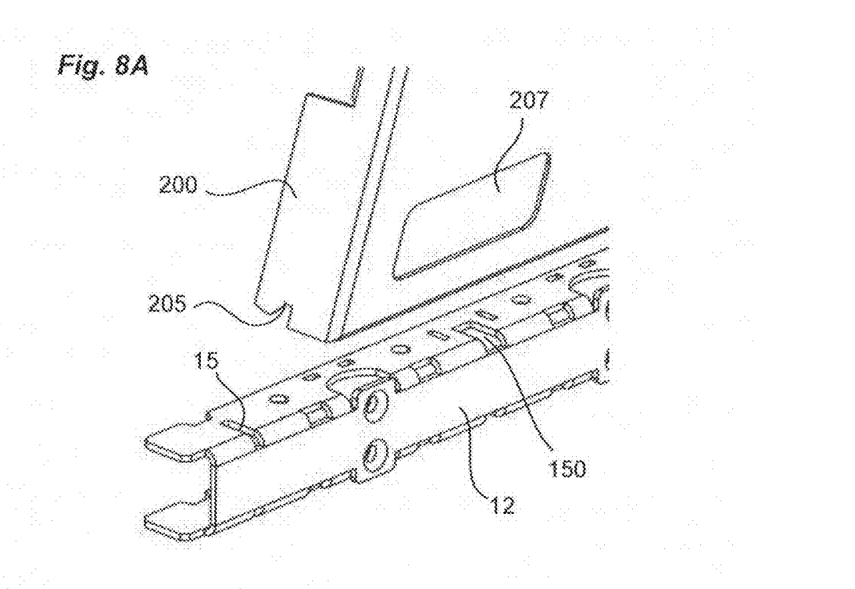
FIGS. 8A to 8C illustrate the fixing principle of a functional unit inside the electric cabinet.
Figure 8B:
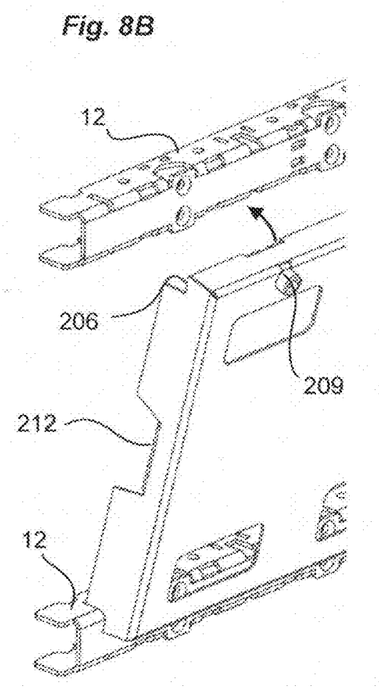
Figure 8C:
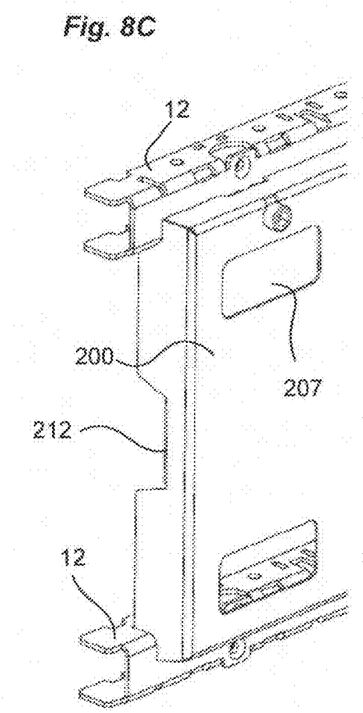

With reference to FIGS. 8A to 8C, the mounting plate 200 of a functional unit 20 comprises two vertical edges each comprising a notch 205 on their bottom part (FIG. 8A) arranged to collaborate with corresponding openings 15 provided on a first cross-member of the inner frame of the electric cabinet. On their top part, the edges comprise a cut-out 206 (FIG. 8B) enabling the mounting plate 200 to snugly follow the shape of a second cross-member of the inner frame, parallel to the first cross-member. In FIG. 8B, it can be seen that the mounting plate is inclined to insert the notches 205 in said openings 15, and the mounting plate is then pivoted in a vertical plane to the vertical position in which it is fixed onto the second cross-member. The notches and cut-outs made on each mounting plate are made in such a way as to ensure contiguity of the functional units between one another and to form the separating partition that is as tight as possible between the two spaces E1, E2. The dimension of the openings 15 enables a single edge of a functional unit to be accommodated at each of the ends of the main cross-member 12, whereas other openings 150 distributed over the length of the main cross-member 12 enable two edges of adjacent functional units to be accommodated. Finally one or more fixing systems can advantageously be inserted in a suitable space on the mounting plate to secure the latter to the main cross-member 12 or secondary cross-member 14, in order to strengthen the link. For instance, it is one or several screws 209 going through openings made through the mounting plate 200, along it length, and coming into corresponding openings made on the cross-members.

According to the invention, the vertical edges of the mounting plate 200 can comprise a cut-out 212 enabling passage at the rear of a main cross-member 12 (FIG. 2E).

Figure 6:
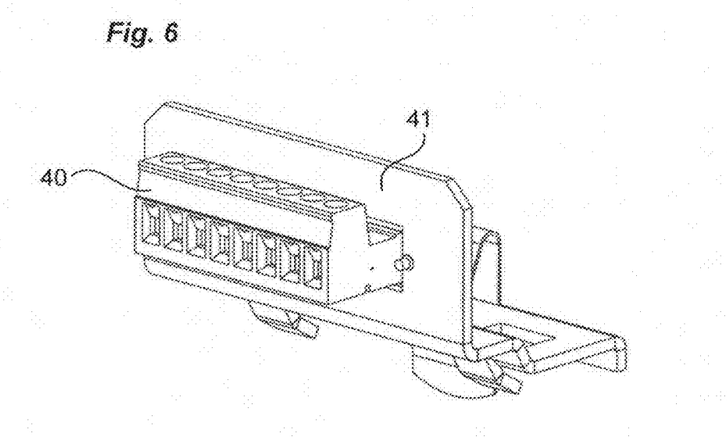
FIG. 6 represents a connector support used in the invention.
Figure 7:
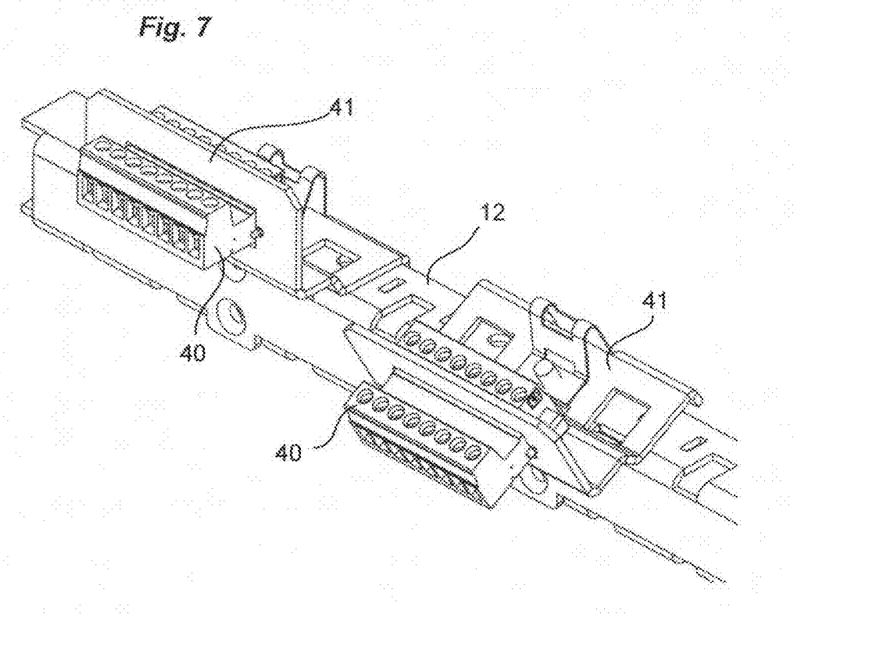
FIG. 7 illustrates fitting of the connector support on an internal upright of the electric cabinet.

According to the invention, the functional assembly also comprises one or more connectors 40 each mounted on a fixing support 41 arranged to be secured by clip-fastening or other means on the uprights or cross-members of the inner frame (FIGS. 6 and 7). Securing of the fixing supports 41 enables installation of the connectors on the inner frame and fitting of the electric distribution system at the rear of the cabinet, in the second space E2.

Each functional unit can thus connect on one or more of these connectors so as to be supplied with power. According to the number and type of electric equipment units present on the functional unit 20, one or more connectors may be necessary for the different power supplies to supply power to the equipment of the functional unit. With reference to FIGS. 3, 4A and 4B, the mounting plate 200 of a functional unit comprises at least one opening 207 through which a connector 40 fitted on its support 41 is inserted. The opening 207 is designed in such a way as to cover the support so as not to compromise the tightness between the two spaces E1, E2 in the cabinet. A power supply cable of the functional unit therefore connects directly onto the connector 40, on the front panel side of the mounting plate 200. On the rear panel side of the mounting plate 200, the cable connected to the connector 40 is interconnected at the rear with the electric distribution system of other functional units or with a power supply source. The arrangement of the invention therefore enables the wiring to be displaced to the second space E2 of the cabinet, enabling the architecture of the functional assembly to be clarified, any risk of nuisance disconnection of a cable to be limited and the surface necessary for running the cables in the front part to be reduced. The connectors 40 being independent with respect to the functional unit, they can easily be replaced or moved.

Figure 12:
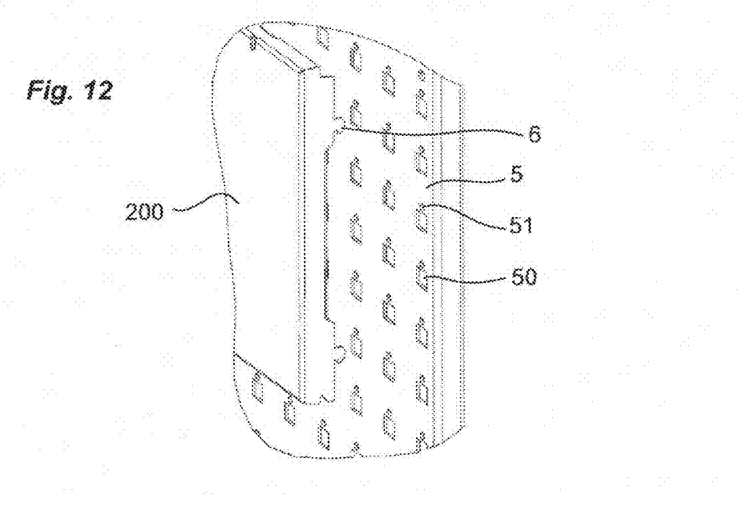
FIG. 12 illustrates the mounting principle of a mounting plate of a functional unit on a mounting panel.

According to the invention, it is possible to provide each mounting plate 200 with further fixing means, allowing the mounting plate 200 to be fixed, not on the already referenced uprights and cross members, but on a mounting panel 5. This mounting panel 5 is made for instance of sheet metal and is arranged at the rear of the electrical cabinet. The mounting panel 5 includes mounting openings distributed at a regular pitch on his surface in order to propose different fixing positions. The mounting panel 5 includes square shaped openings and, just over the top of each of these square shaped openings, a round shaped opening 51. FIG. 12 shows these other fixing means which includes hooks 6, made along each vertical edge of the mounting plate 200 of a functional unit. These hooks are aimed to be inserted in square shaped hooks 50 of the mounting panel 5 whereas the locking of the mounting plate 200 on the mounting panel 5 is fulfilled with screws 209, identical with the screws described above, coming through openings of the mounting plate 200 and into round shaped openings 51.

The invention therefore presents several advantages, it enables a modular mechanical arrangement and a perfect adjustability to customer requirements to be proposed, the thermal particularity of each equipment unit fitted on a functional unit to be taken into account, and the installation area to be optimized by an electric distribution system located in the rear part of the electric cabinet.

The invention claimed is:

1. An electric cabinet comprising a front part and a rear part, an outer frame defining the general shape of the electric cabinet and an inner frame comprising fixing uprights and cross-members positioned in one and the same plane, a functional assembly fixed onto the inner frame and comprising a plurality of functional units each provided with a mounting plate designed to receive one or more electric units, characterized in that:
the mounting plates are fixed onto said fixing uprights and cross-members in contiguous manner to form a separating partition arranged in said plane and delineating a first space located towards the front part and a second space located towards the rear part,
each mounting plate comprises at least one opening,
the functional assembly comprises at least one connector support fixed in independent manner on an upright or a cross-member of the inner frame and a connector arranged on said support, said support being positioned on the fixing upright or cross-member in such a way as to enable the connector to pass through said at least one opening made through a mounting plate.

2. The electric cabinet according to claim 1, characterized in that each mounting plate comprises notches designed to collaborate with openings made on fixing uprights or cross-members of the inner frame.

3. The electric cabinet according to claim 1, characterized in that the connector support comprises a fixing system by clip-fastening onto an upright or a cross-member of the inner frame.

4. The electric cabinet according to claim 1, characterized in that each mounting plate is of rectangular shape presenting a front face for fixing electric units and a rear face.

5. The electric cabinet according to claim 4, characterized in that the mounting plate comprises a DIN rail or a plate fixed onto the rear face so as to be able to fix one or more electric units.

6. The electric cabinet according to claim 1, characterized in that the inner frame comprises two vertical main uprights, and several horizontal main cross-members, extending between the two main uprights.

7. The electric cabinet according to claim 6, characterized in that each mounting plate comprises an indentation enabling passage of a main cross-member.

8. The electric cabinet according to claim 6, characterized in that the inner frame comprises at least one vertical secondary upright, extending between two main cross-members.

9. The electric cabinet according to claim 8, characterized in that the inner frame comprises at least one secondary horizontal cross-member, extending between a secondary upright and a main upright or between two secondary uprights.

10. The electric cabinet according to claim 8, characterized in that each mounting plate comprises two parallel vertical edges provided, and their bottom part, with notches arranged to collaborate with openings made on a first cross-member of the inner frame and, on their top part, with a cut-out enabling the shape of the second cross-member of the inner frame to be snugly followed.

11. The electric cabinet according to claim 1, characterized in that the mounting plate comprises an opening designed to receive a lifting ring or a gripping handle.

12. The electric cabinet according to claim 1, characterized in that the mounting plate includes hooks arranged to fix the mounting plate on a mounting panel.

* * * * *